(12) United States Patent  
Taniguchi et al.

(10) Patent No.: US 7,872,448 B2  
(45) Date of Patent: Jan. 18, 2011

(54) POWER SUPPLY SYSTEM AND PORTABLE EQUIPMENT USING THE SAME

(75) Inventors: Akihiro Taniguchi, Hyogo (JP); Toshihiko Ichinose, Nara (JP)

(73) Assignee: Panasonic Corporation, Osaka (JP)

( * ) Notice: Subject to any disclaimer, the term of this patent is extended or adjusted under 35 U.S.C. 154(b) by 389 days.

(21) Appl. No.: 10/581,554

(22) PCT Filed: Dec. 9, 2005

(86) PCT No.: PCT/JP2005/022642

§ 371 (c)(1),  
(2), (4) Date: Jun. 2, 2006

(87) PCT Pub. No.: WO2006/064726

PCT Pub. Date: Jun. 22, 2006

(65) Prior Publication Data

US 2007/0131268 A1     Jun. 14, 2007

(30) Foreign Application Priority Data

Dec. 15, 2004    (JP)   ............................ 2004-362657

(51) Int. Cl.  
*H02J 7/00*      (2006.01)  
*G01N 27/416*    (2006.01)

(52) U.S. Cl. .................. 320/131; 320/134; 320/136; 320/150; 320/152; 320/154; 324/433; 324/435; 324/441

(58) Field of Classification Search .................. 320/134, 320/136, 150, 152, 154, 131; 324/433, 435, 324/441

See application file for complete search history.

(56) References Cited

U.S. PATENT DOCUMENTS

| | | | | | |
|---|---|---|---|---|---|
| 4,609,860 | A | * | 9/1986 | Fasen | 320/131 |
| 5,767,659 | A | * | 6/1998 | Farley | 320/106 |
| 6,008,626 | A | * | 12/1999 | Sato et al. | 320/132 |
| 6,268,713 | B1 | * | 7/2001 | Thandiwe | 320/134 |
| 6,456,041 | B1 | * | 9/2002 | Terada et al. | 320/132 |
| 6,714,882 | B1 | * | 3/2004 | Iwaizono | 702/63 |

(Continued)

FOREIGN PATENT DOCUMENTS

JP          09-298844      11/1997

(Continued)

*Primary Examiner*—Edward Tso  
*Assistant Examiner*—Johali A. Torres Ruiz  
(74) *Attorney, Agent, or Firm*—McDermott Will & Emery LLP

(57) ABSTRACT

A power supply system for portable equipment has a lithium-ion secondary battery as a power supply, a temperature detection portion for detecting a temperature of the power supply, a voltage detection portion for detecting a voltage of the power supply, a memory portion, and a forced discharge portion. The memory portion stores a control operating temperature, a control operating voltage and a control termination voltage. The forced discharge portion recognizes an abnormality of the power supply when the temperature of the power supply is at least the control operating temperature and the voltage of the power supply is at least the control operating voltage. Then, the forced discharge portion electrifies the notification portion and makes it inform a message indicating that the abnormality is being avoided. The forced discharge portion forcedly discharges the power supply until the voltage of the power supply reaches the control termination voltage.

9 Claims, 2 Drawing Sheets

U.S. PATENT DOCUMENTS

| | | | |
|---|---|---|---|
| 2003/0178968 A1 * | 9/2003 | Sakakibara et al. | 320/110 |
| 2005/0106455 A1 * | 5/2005 | Yoshida et al. | 429/178 |

FOREIGN PATENT DOCUMENTS

| | | |
|---|---|---|
| JP | 2000-078250 | 3/2000 |
| JP | 2000-270494 | 9/2000 |
| JP | 2002-056900 | 2/2002 |

* cited by examiner

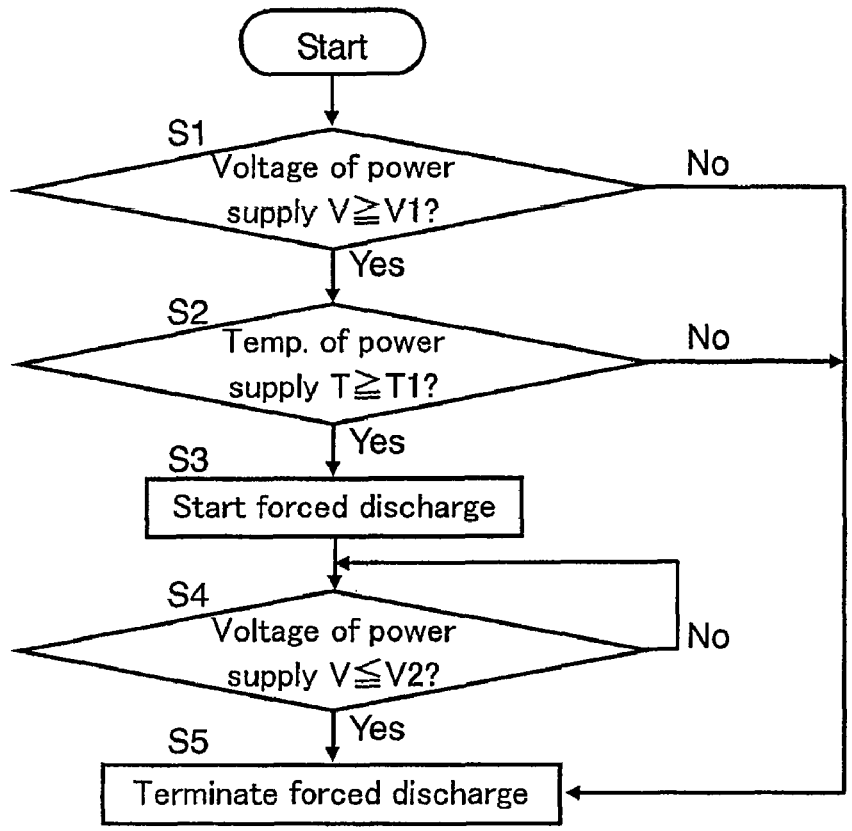
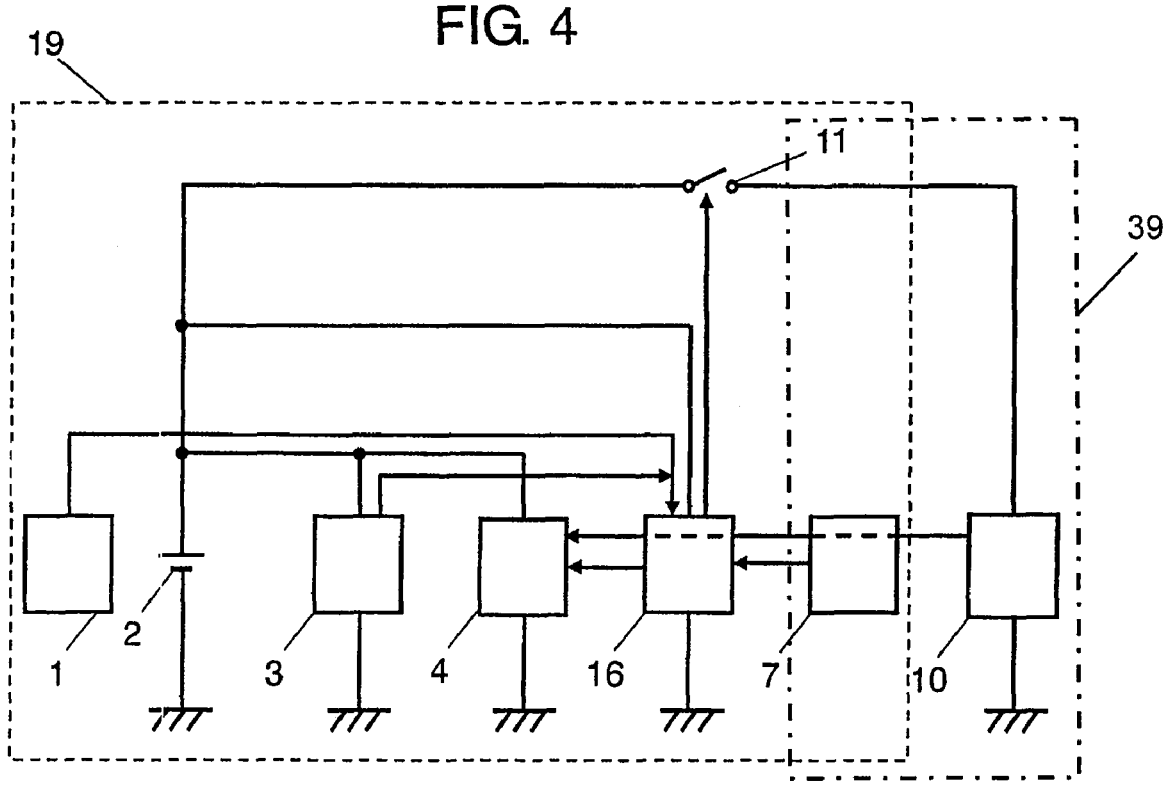

POWER SUPPLY SYSTEM AND PORTABLE EQUIPMENT USING THE SAME

CROSS REFERENCE TO RELATED APPLICATIONS

This application is a U.S. national phase of PCT international application PCT/JP2005/022642, filed Dec. 9, 2005, which claims priority from Japanese patent application 2004-362657, filed Dec. 15, 2004.

TECHNICAL FIELD

The present invention relates to a power supply system for portable equipment in which a lithium-ion secondary battery is mounted. More particularly, it relates to functions provided for avoiding battery expansion at high temperatures and improving the convenience for a user by displaying that the battery expansion has been avoided.

BACKGROUND ART

In recent years, portable equipment has become smaller in size and lighter in weight, and accordingly there has been increasing demand for lithium-ion secondary batteries having light weight and high energy density. While such batteries have the above-mentioned advantages, they tend to deteriorate when they are left at high temperatures because they include electrolyte containing an organic solvent. In particular, when the battery is left at high temperatures in a state in which it is charged to 100%, the electrolyte is decomposed on the surface of the positive electrode to generate gases, resulting in increasing the inner pressure. As a result, the battery may be expanded and deformed.

In order to solve this problem, for example, Japanese Patent Unexamined Publication No. 2002-56900 discloses the following configuration. That is to say, a temperature sensor is fixed on the outer surface of a battery, and when a temperature of the battery is not lower than a predetermined temperature and a voltage is not lower than a predetermined voltage, the battery is discharged through a discharge resistor inside a battery pack. Thereby, the voltage of the battery is reduced. However, this configuration does not have a function of displaying an error message. Therefore, a user of portable equipment does not notice that the remaining capacity of the battery is reduced because the battery is discharged in order to avoid an abnormality. When the portable equipment is a portable telephone, the user may simply not recognize that the deterioration of the battery shortens the standby time and therefore the battery needs to be replaced by a new one. Furthermore, the user may repeat the misrecognition after the battery is replaced with a new one because there is no opportunity to know what the abnormal state of a battery is like.

Furthermore, for example, Japanese Patent Unexamined Publication No. 2000-78250 discloses a portable telephone in which when an abnormality associated with a battery occurs during the standby time, the occurrence of the abnormality is displayed on a display portion. This portable telephone determines a state of the battery and displays the state during the standby time, that is, when the power-supply is on. Therefore, for example, when the portable telephone is left in an abnormal state with power supply turned off, a state of the battery cannot be diagnosed and an error message cannot be displayed. Furthermore, since only a function of informing a user that a battery is abnormal is described, a user cannot know whether or not this abnormality can be avoided.

SUMMARY OF THE INVENTION

The present invention provides a power supply system for portable equipment having a function of forcedly avoiding an abnormality when the battery reaches an abnormal state regardless of whether the power supply is on or off and further informing a user that the abnormality has been avoided. The power supply system for portable equipment of the present invention includes a notification portion, a power supply, a temperature detection portion, a voltage detection portion, a memory portion and a forced discharge portion. The power supply includes a lithium-ion secondary battery. The temperature detection portion detects a temperature of the power supply. The voltage detection portion detects a voltage of the power supply. The memory portion stores a first temperature that is a control operating temperature, a first voltage that is a control operating voltage and a second voltage that is a control termination voltage smaller than the first voltage. The forced discharge portion recognizes that the power supply is abnormal when the temperature of the power supply detected by the temperature detection portion is not lower than the first temperature and the voltage of the power supply detected by the voltage detection portion is not lower than the first voltage. Then, the forced discharge portion electrifies the notification portion by the power supply and makes the notification portion notify a message indicating that an abnormality is being avoided. Furthermore, the forced discharge portion forcedly discharges the power supply until the voltage of the power supply detected by the voltage detection portion reaches the second voltage. With this configuration, when a state in which a battery is exposed to an abnormal environment is detected from temperature and voltage, the battery is forcedly discharged. Thus, the generation of gases inside the battery is avoided at an early stage so as to prevent the battery expansion and deformation, and meanwhile the notification portion notifies that forced discharge is being carried out, thereby remarkably improving the convenience for a user.

BRIEF DESCRIPTION OF DRAWINGS

FIG. 3 is a flowchart showing a control algorithm of the power supply system for a portable telephone in accordance with the first exemplary embodiment of the present invention.

FIG. 4 is a circuit diagram showing a power supply system for a portable telephone in accordance with a second exemplary embodiment of the present invention.

DETAILED DESCRIPTION OF PREFERRED EMBODIMENTS

Hereinafter, exemplary embodiments of the present invention are described with reference to drawings. In the exemplary embodiments, a portable telephone is described as an example of portable equipment.

First Exemplary Embodiment

Figure 1:
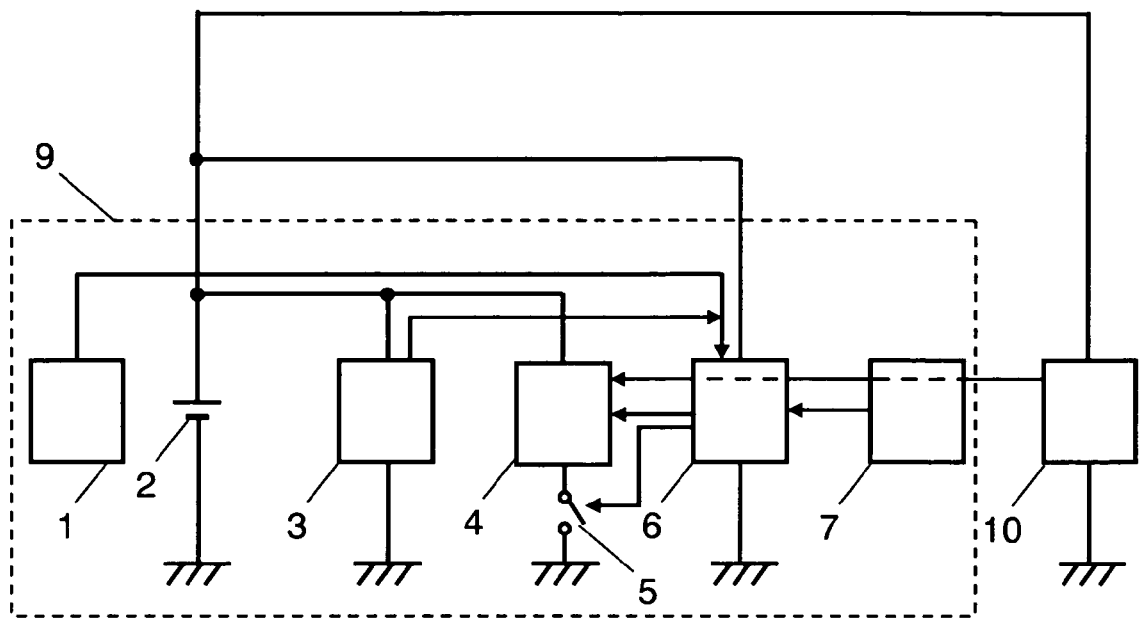
FIG. 1 is a circuit diagram showing a power supply system for a portable telephone in accordance with a first exemplary embodiment of the present invention.

FIG. 1 is a circuit diagram showing an example of a power supply system for a portable telephone in accordance with the first exemplary embodiment of the present invention. Power supply system 9 includes temperature detection portion 1, power supply 2, voltage detection portion 3, display portion 4 that is a notification portion, switch 5, control portion 6 and memory portion 7. Power supply 2 is composed of a lithium-ion secondary battery. Temperature detection portion 1 provided in the vicinity of power supply 2 is composed of, for example, a thermistor, measures temperature T of power supply 2, and sends data to control portion 6. Voltage detection portion 3 is composed of a well-known voltage monitor circuit, measures voltage V of power supply 2, and sends data to control portion 6. Control portion 6 is composed of a microcomputer and the like, and controls the on/off of switch 5 based on the data sent from temperature detection portion 1 and voltage detection portion 3 and data stored in memory portion 7. Switch 5 is coupled in series with display portion 4 and coupled to power supply 2. Power supply 2 constantly feeds control portion 6 and feeds equipment circuit (hereinafter, referred to as circuit) 10 of the portable equipment. Display portion 4 is composed of a liquid crystal panel, and the like. Display portion 4 is fed from power supply 2 through circuit 10 in a normal use state, and displays data such as presence or absence of incoming call and clock display sent from circuit 10.

Memory portion 7 has a nonvolatile memory and stores control operating temperature T1 that is the first temperature, control operating voltage V1 that is the first voltage, and control termination voltage V2 that is the second voltage. The value of V2 is smaller than the value of V1. Control portion 6 controls switch 5 so as to forcedly discharge power supply 2 when both $T \geq T1$ and $V \geq V1$ are satisfied, even in the case where the power feed from power supply 2 to circuit 10 is off. Thus, display portion 4 is electrified. Then, control portion 6 makes display portion 4 display a message indicating that an abnormality is being avoided. Discharge of power supply 2 proceeds according to this displayed message, and the forced discharge is terminated at the time when voltage V reaches V2. Thus, control portion 6 and switch 5 constitute a forced discharge portion for forcedly discharging power supply 2. That is to say, the forced discharge portion recognizes that the state of power supply 2 is abnormal when the temperature of power supply 2 detected by temperature detection portion 1 is not lower than T1 and the voltage of power supply 2 detected by voltage detection portion 3 is not lower than V1. At this time, the forced discharge portion electrifies display portion 4 by power supply 2 and makes display portion 4 display a message indicating that the abnormality is being avoided. Then, until the voltage of power supply 2 detected by voltage detection portion 3 reaches V2, power supply 2 is forcedly discharged.

Figure 2:
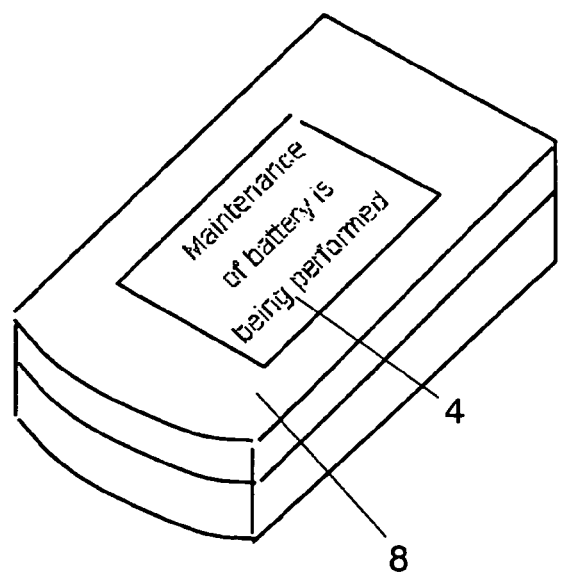
FIG. 2 is a schematic perspective view showing a portable telephone using the power supply system in accordance with the first exemplary embodiment of the present invention.

FIG. 2 is a schematic perspective view showing a portable telephone using the power supply system of the present invention and shows a state in which forced discharge is being carried out. Display portion 4 provided in portable telephone 8 displays a message, for example, "Maintenance of battery is being performed" indicating that an abnormality is being avoided, and informs a user that power supply 2 is being forcedly discharged. Although FIG. 2 shows a folding type portable telephone, the shape is not particularly limited to this shape as long as display portion 4 is provided. Furthermore, in a case of a folding type portable telephone, it is preferable that a message is displayed so that a user can see it. That is to say, it is preferable that a message is displayed on display portion 4 provided at the outside rather than on a display portion (not shown) located at the inside when the portable telephone is folded. However, from the viewpoint of promoting discharge, a message may be displayed on a display portion (not shown) located at the inside when a portable telephone is folded other than on display portion 4 provided at the outside.

Next, controlling by the power supply system in accordance with this exemplary embodiment is described. FIG. 3 is a flowchart showing a control algorithm of the power supply system for a portable telephone in accordance with the exemplary embodiment of the present invention. Firstly, in S1, when voltage V measured by voltage detection portion 3 is not lower than control operating voltage V1, temperature detection portion 1 measures temperature T as in S2. When temperature T is not lower than control operating temperature T1, control portion 6 turns on switch 5 so as to display a message indicating that an abnormality is being avoided on a display portion 4. Thereby, forced discharge is started (S3). Also during the forced discharge, voltage detection portion 3 continues measurement (S4). When voltage V reaches control termination voltage V2, the forced discharge is terminated and message display on display portion 4 is also ended (S5).

As mentioned above, the power supply system in accordance with this exemplary embodiment forcedly discharges power supply 2 automatically based on temperature T and voltage V of power supply 2 even in the state in which the power feed from power supply 2 to portable telephone 8 is off. Moreover, the power supply system not only avoids an abnormality by simply carrying out forced discharge but also makes a user determine that power supply 2 after forced discharge is not out of order. Therefore, a user can avoid unnecessary replacement of batteries. Furthermore, since a user notices the forced discharge, the user can move the portable equipment from an abnormal environment for batteries to other places. From this experience, the user learns the abnormal environment for batteries and would not leave the portable equipment in the abnormal environment again. Thus, the lifetime of the battery can be increased. That is to say, according to the power supply system in accordance with this exemplary embodiment, it is possible to avoid a lithium-ion secondary battery that is easily deteriorated at high temperatures from an abnormal state. Furthermore, the power supply system can inform the user that the battery is not out of order and make the user learn thereof, so that portable equipment that is more convenient for users and safer can be provided.

Furthermore, it is preferable that control portion 6 makes memory portion 7 store data indicating that forced discharge is completed and switch 5 is turned off. Then, it is preferable that when the power feed from power supply 2 to circuit 10 of portable telephone 8 is turned on, the data are read out from memory portion 7 and a message indicating that the abnormality has been avoided is displayed on display portion 4. In this way, by making memory portion 7 store the termination of the forced discharge and by displaying that the forced discharge has been terminated when power supply 2 becomes in a usable state, the same effect of making a user notice it during the forced discharge can be obtained. A message displayed on display portion 4 indicating that an abnormality has been avoided includes, for example, "Maintenance of battery was completed." Note here that a memory portion, which store data indicating that forced discharge has been completed and switch 5 has been turned off, may be provided independently from memory portion 7.

In the above description, the forced discharge portion is composed of control portion 6 and switch 5. However, the configuration is not limited to this, and a circuit configuration may be employed, in which switch 5 may have a switching element and be integrated with control portion 6.

Second Exemplary Embodiment

FIG. 4 is a circuit diagram showing an example of a power supply system for a portable telephone in accordance with a second exemplary embodiment of the present invention. The appearance of the portable telephone that is an example of the portable equipment including this power supply system is similar to that shown in FIG. 2. The same reference numerals are given to those for the same configuration in the first exemplary embodiment and detail description is omitted herein.

Power supply system 19 of this exemplary embodiment is different from power supply system 9 of the first exemplary embodiment in that switch 5 is not provided and power supply 2 feeds circuit 10 through switch 11 controlled by control portion 16. Switch 11 is turned on in synchronization with a power supply switch (not shown) of portable equipment when a user uses the portable equipment.

Control portion 16 turns on switch 11 and forcedly discharges power supply 2 when both $T \geq T1$ and $V \geq V1$ are satisfied in a state in which switch 11 is turned off and the power feed from power supply 2 to circuit 10 of portable equipment 8 is off. Then, control portion 16 makes display portion 4 display a message indicating that an abnormality is being avoided. Discharge of power supply 2 proceeds according to the displayed message and electrification of circuit 10, and at the time voltage V reaches V2, the forced discharge is terminated. Thus, control portion 16 and switch 11 constitute a forced discharge portion for forcedly discharging power supply 2. That is to say, the forced discharge portion recognizes an abnormality of power supply 2 when the temperature of power supply 2 detected by temperature detection portion 1 is not lower than T1 and the voltage of power supply 2 detected by voltage detection portion 3 is not lower than V1. At this time, the forced discharge portion electrifies display portion 4 by power supply 2 through circuit 10 and makes display portion 4 display a message indicating that an abnormality is being avoided. Then, until the voltage of power supply 2 detected by voltage detection portion 3 reaches V2, power supply 2 is forcedly discharged. Note here that control portion 16 may send a signal to circuit 10, circuit 10 may receive it and make display portion 4 display a message indicating that an abnormality is being avoided.

It is preferable that when the forced discharge is completed, control portion 16 turns off switch 11. This makes it possible to prevent the remaining capacity of power supply 2 from reducing more than necessarily after the forced discharge.

Furthermore, it is preferable that control portion 16 makes memory portion 7 store data indicating that forced discharge has been completed and switch 11 has been turned off. Then, it is preferable that when switch 11 is turned on and the power feed from power supply 2 to circuit 10 is on, the data are read out from memory portion 7 and a message indicating that the abnormality has been avoided is displayed on the display portion 4. In this way, by making memory portion 7 store the termination of the forced discharge and by displaying that the forced discharge has been terminated when power supply 2 become in a usable state, the same effect of making a user notice it during forced discharge can be obtained. A message displayed on display portion 4 indicating that an abnormality has been avoided includes, for example, "Maintenance of battery was completed." Note here that a memory portion, which stores data indicating that forced discharge has been completed and switch 11 has been turned off, may be provided independently from memory portion 7.

In the above description, the forced discharge portion is composed of control portion 16 and switch 11. However, the configuration is not limited to this, and a circuit configuration may be employed, in which switch 11 may consist of a switching element and be integrated with control portion 16.

Similar to the combination of switch 5 and display portion 4 in the first exemplary embodiment, a discharging circuit in which a switch and a resistor coupled in series with the switch are coupled to power supply 2, may be additionally provided. Then, control portion 16 controls this switch. Such a configuration can be also applied to, for example, a case where it is necessary to increase electric current for forced discharge such as a case where a voltage of power supply 2 is high and a temperature shown by temperature detection portion 1 is high.

At least any of control portion 16, memory portion 7, switch 11 and voltage detection portion 3 may be integrated with circuit 10 (see, for example reference numeral 39 in FIG. 4). Also in this case, the same effect as mentioned above can be obtained.

As the effect in the first and second exemplary embodiments, it is preferable that an active material of the positive electrode of lithium-ion secondary battery constituting power supply 2 contains nickel complex oxide. In this case, large capacitance of power supply 2 can be achieved. Furthermore, it is more preferable that since in such batteries, the electrolyte is remarkably decomposed on the surface of the positive electrode at high temperatures, the effect of the present invention is significant.

In the case where an active material of the positive electrode of the lithium-ion secondary battery constituting power supply 2 contains nickel complex oxide, it is preferable that control operating temperature T1 is not lower than 55° C. and not higher than 65° C., control operating voltage V1 is not lower than 4.05V and not higher than 4.15V for each battery, and control termination voltage V2 is not lower than 3.85V and not higher than 3.95V for each battery. When control operating temperature T1, control operating voltage V1 and control termination voltage V2 are in the range mentioned above, the present invention can be reliably carried out without mistakenly determining that a battery containing nickel complex oxide in the active material of the positive electrode is in an abnormal state.

In the first and second exemplary embodiments, display portion 4 which appeals to user's vision is described as an example of the notification portion. However, the notification portion may be configured by a voice output device, such as a speaker which appeals to user's sense of hearing. That is to say, the notification portion informs a user of a message indicating that an abnormality is being avoided or that an abnormality has been avoided. Furthermore, display portion 4 shares a part of portable telephone 8, however, it may be provided independently for the special purpose of power supply system 9. That is to say, the notification portion may be provided at the side of portable telephone 8 or at the side of power supply system 9.

In the above description, the exemplary embodiment of the present invention is described on a portable telephone as an example. However, the present invention is not limited to a portable telephone and may be applied to portable equipment having a display portion, for example, a portable television, a digital still camera, a portable music reproducer, and the like.

INDUSTRIAL APPLICABILITY

According to the present invention, storing characteristics at high temperatures, which is a disadvantage of a lithium-ion secondary battery that has a large capacity, can be overcome as a power supply system, and user's convenience can be radically improved. Therefore, it can be expected that the battery system is employed in portable equipment in general and the industrial applicability is extremely high.

The invention claimed is:

1. A power supply system for supplying portable equipment with electric power, comprising:
   a notification portion;
   a power supply for supplying electric power to at least the notification portion, the power supply including a lithium-ion secondary battery;
   a temperature detection portion for detecting a temperature of the power supply;
   a voltage detection portion for detecting a voltage of the power supply;
   a memory portion for storing a first temperature, a first voltage and a second voltage that is smaller than the first voltage; and
   a forced discharge portion for recognizing an abnormality of the power supply when the temperature of the power supply detected by the temperature detection portion is not lower than the first temperature and the voltage of the power supply detected by the voltage detection portion is not lower than the first voltage when a power feed from the power supply to the portable equipment for operation of the portable equipment is off, for forcedly discharging the power supply until the voltage of the power supply detected by the voltage detection portion reaches the second voltage, and for electrifying the notification portion by the power supply, thereby making the notification portion continuously notify a message indicating that the abnormality is being avoided while the power supply is forcedly being discharged,
   wherein the forced discharge portion includes a control portion configured to make the memory portion store data indicating that forced discharge has completed when the forced discharge completed, and
   the control portion is further configured to make the notification portion notify a message indicating that the abnormality has been avoided based on the data indicating that the forced discharge is completed, when the power feed from the power supply to the portable equipment for operation of the portable equipment becomes turned on.

2. The power supply system according to claim 1, wherein the forced discharge portion further includes:
   a switch coupled in series to the power supply together with the notification portion, and
   the control portion is configured to turn on the switch when the abnormality of the power supply is recognized, and to turn off the switch when the voltage of the power supply detected by the voltage detection portion reaches the second voltage.

3. The power supply system according to claim 1, wherein the forced discharge portion further includes a switch disposed in the power feed line from the power supply to the portable equipment; and
   the control portion is further configured to turn on the switch for forcedly discharging the power supply when the abnormality of the power supply is recognized.

4. The power supply system according to claim 3, wherein the control portion turns off the switch when the voltage of the power supply detected by the voltage detection portion reaches the second voltage.

5. The power supply system according to claim 1, wherein an active material of a positive electrode of the lithium-ion secondary battery comprises nickel complex oxide.

6. The power supply system according to claim 5, wherein the first temperature is not lower than 55° C. and not higher than 65° C., the first voltage is not lower than 4.05V and not higher than 4.15V for each lithium-ion secondary battery, and the second voltage is not lower than 3.85V and not higher than 3.95V for each lithium-ion secondary battery.

7. A power supply system for supplying portable equipment having a notification portion with electric power, comprising:
   a power supply for supplying electric power to at least the notification portion, the power supply including a lithium-ion secondary battery;
   a temperature detection portion for detecting a temperature of the power supply;
   a voltage detection portion for detecting a voltage of the power supply;
   a memory portion for storing a first temperature, a first voltage and a second voltage that is smaller than the first voltage; and
   a forced discharge portion for recognizing an abnormality of the power supply when the temperature of the power supply detected by the temperature detection portion is not lower than the first temperature and the voltage of the power supply detected by the voltage detection portion is not lower than the first voltage when the electric power from the power supply to the portable equipment for operation of the portable equipment is off, for forcedly discharging the power supply until the voltage of the power supply detected by the voltage detection portion reaches the second voltage, and for electrifying the notification portion by the power supply, thereby making the notification portion continuously notify a message indicating that the abnormality is being avoided while the power supply is forcedly being discharged,
   wherein the forced discharge portion includes a control portion configured to make the memory portion store data indicating that forced discharge has completed when the forced discharge completed, and
   the control portion is further configured to make the notification portion notify a message indicating that the abnormality has been avoided based on the data indicating that the forced discharge is completed, responsive to turning on the electric power from the power supply to the portable equipment for operation of the portable equipment.

8. Portable equipment comprising:
   a notification portion;
   a power supply for supplying electric power to at least the notification portion, the power supply including a lithium-ion secondary battery;
   a temperature detection portion for detecting a temperature of the power supply;
   a voltage detection portion for detecting a voltage of the power supply;
   a memory portion for storing a first temperature, a first voltage and a second voltage;
   a forced discharge portion for recognizing an abnormality of the power supply when the temperature of the power supply detected by the temperature detection portion is not lower than the first temperature and the voltage of the power supply detected by the voltage detection portion is not lower than the first voltage when an electric power from the power supply to the portable equipment for operation of the portable equipment is off, for forcedly discharging the power supply until the voltage of the power supply detected by the voltage detection portion reaches the second voltage, and for electrifying the notification portion by the power supply, thereby making the notification portion continuously notify a message indicating that the abnormality is being avoided while the power supply is forcedly being discharged; and an equipment circuit for operating the portable equipment, the equipment circuit being supplied by the power supply, wherein the forced discharge portion includes a control portion configured to make the memory portion store data indicating that forced discharge has completed when the forced discharge completed, and the control portion is further configured to make the notification portion notify a message indicating that the abnormality has been avoided based on the data indicating that the forced discharge is completed, when the electric power from the power supply to the portable equipment for operation of the portable equipment is turned on.

9. The portable equipment according to claim 8, wherein at least one of the voltage detection portion, the memory portion, and the forced discharge portion is integrated with the equipment circuit.

* * * * *